US 6,812,967 B1

(12) United States Patent
Niikawa et al.

(10) Patent No.: US 6,812,967 B1
(45) Date of Patent: Nov. 2, 2004

(54) DIGITAL CAMERA HAVING MULTIPLE DISPLAYS

(75) Inventors: Masahito Niikawa, Sakai (JP);
Toshiyuki Tanaka, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 736 days.

(21) Appl. No.: 09/735,569

(22) Filed: Dec. 12, 2000

(30) Foreign Application Priority Data

Dec. 15, 1999 (JP) ......................................... P11-355901

(51) Int. Cl.[7] .............................................. H04N 5/222
(52) U.S. Cl. ............................ 348/333.05; 348/333.11; 348/333.12
(58) Field of Search ...................... 348/333.01, 333.02, 348/333.05, 333.08, 333.11, 333.12, 207.99, 345, 346, 362, 222.1, 223.1, 347, 240.3, 373, 374, 375, 376, 211.99, 211.4, 211.8, 211.12, 220.1, 221.1

(56) References Cited

U.S. PATENT DOCUMENTS 5,557,328 A * 9/1996 Ishihama et al. ......... 348/240.3
5,982,429 A    11/1999 Kamamoto et al. ......... 348/333
6,452,628 B2 *  9/2002 Kato et al. .............. 348/333.12
2001/0010561 A1 *  8/2001 Nagai .......................... 348/371
2001/0012072 A1 *  8/2001 Ueno .................... 348/333.02
2003/0160886 A1 *  8/2003 Misawa et al. ............. 348/347

FOREIGN PATENT DOCUMENTS

JP          10-322629 A      12/1998

* cited by examiner

*Primary Examiner*—Tuan Ho
(74) *Attorney, Agent, or Firm*—Sidley Austin Brown & Wood LLP

(57) ABSTRACT

A digital camera of the invention has an LCD and an EVF. In a third display mode, a whole image is displayed on the LCD, a frame is displayed in the central area, and an image in the central area (within the frame) is enlargedly displayed on the EVF. An enlarged display icon is displayed on the LCD to thereby notify the user of the enlarged display on the EVF. The image capturing range can be confirmed on the LCD, and automatic focusing is performed on the basis of the image in the central area, so that focus can be also confirmed on the EVF. Consequently, according to the invention, both the image capturing range and the focus can be confirmed in the digital camera and an image can be efficiently captured.

21 Claims, 13 Drawing Sheets

EVF DISPLAY SCREEN

LCD DISPLAY SCREEN

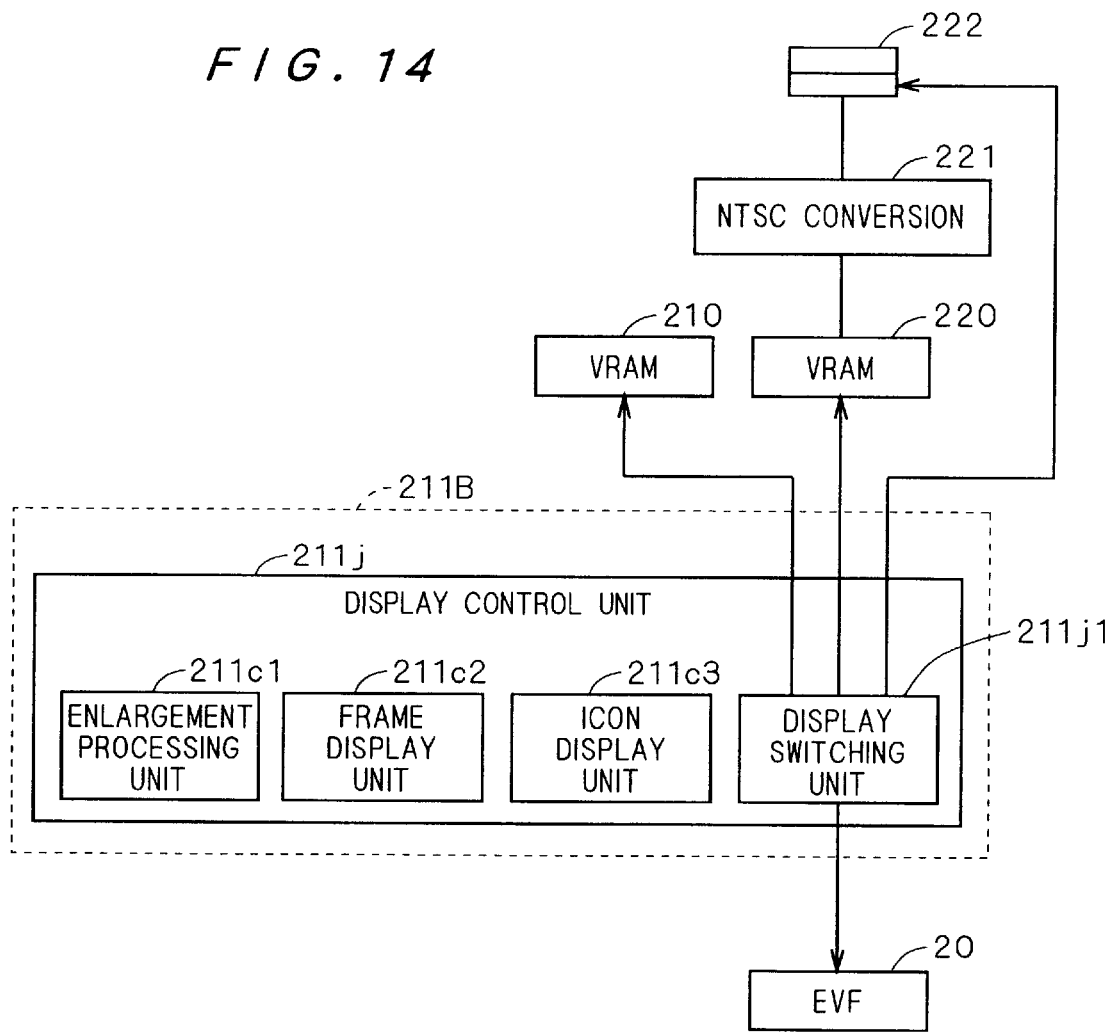
F I G. 14

DIGITAL CAMERA HAVING MULTIPLE DISPLAYS

This application is based on application No. 11-355901 filed in Japan, the contents of which are hereby incorporated by reference.

BACKGROUND OF THE INVENTION

1. Field of the Invention

The present invention relates to an electronic camera having a first display and a second display, and a display system having an electronic camera including displays and a display device capable of displaying an image captured by the electronic camera in a state where the display device is connected to the electronic camera for communications.

2. Description of the Background Art

In an electronic camera, to respond the demand for higher picture quality, the number of pixels is increasing. On the other hand, the size of the display (display means) of an electronic camera is limited due to the limitation of the size of the camera. The number of pixels for display is accordingly limited.

Under such circumstances, it is becoming difficult to confirm focus in the display device. Even in the case of an auto-focus camera, it is indispensable to confirm focus to obtain an image as intended.

Although there is a technique of facilitating confirmation of focus by enlargedly displaying an image on a display, such a technique has a problem that the image capturing range cannot be confirmed at the time of confirming focus.

On the other hand, an electronic camera which displays an image by switching two kinds of displays of an EVF (Electronic View Finder) and an LCD (Liquid Crystal Display) is being practically used.

In an electronic camera having the EVF and the LCD, however, when one of the displays is used, the other display is in an OFF state. It is difficult to say that sufficient consideration has been given to proper use of the displays. Although there are a plurality of displays, the confirmation of focus and the confirmation of the image capturing range cannot be concurrently made, so that an image cannot be efficiently captured.

SUMMARY OF THE INVENTION

The present invention is directed to provide an electronic camera.

The electronic camera includes: a first display capable of displaying a captured image; a second display capable of displaying the captured image, having a display size smaller than that of the first display; a first display controller for displaying an image in a first area in the captured image on the first display; and a second display controller for displaying an image in a second area narrower than the first area in the captured image onto the second display.

According to an aspect of the invention, the first area in the electronic camera corresponds to a whole area of the captured image, and the second area corresponds to a central area in the captured image. Consequently, in the case of capturing an image in which the subject is positioned in the center, whether focus is accurately achieved on the subject or not can be confirmed.

According to another aspect of the invention, the second area in the electronic camera is variable. Consequently, the range to be displayed on the second display can be changed according to the intention of the user.

According to further another aspect of the invention, the electronic camera further has a memory for storing information in the second area, and the second display controller displays an image in the second area based on information stored in the memory onto the second display when power is turned on. Consequently, when the power of the electronic camera is turned off and is again turned on, the user does not have to set the same area as that at the time of turn-off of the power. It facilitates the operation.

The present invention also provides a display control method of an electronic camera having a first display capable of displaying a captured image and a second display capable of displaying a captured image having a display size smaller than that of the first display.

The display control method has the steps of: capturing an image of a subject; displaying an image in a first area in a captured image on the first display; and displaying an image in a second area narrower than the first area in the captured image on the second display.

Further, the present invention also provides a display system having an electronic camera and an external display device capable of displaying an image captured by the electronic camera in a state where the display device is connected to the electronic camera.

The display system has: a first display capable of displaying a captured image; a second display capable of displaying the captured image; a first display controller for displaying an image in a first area in the captured image onto the first display; and a second display controller for enlargedly displaying an image in a second area narrower than the first area in the captured image onto the second display.

Consequently, the image capturing range can be confirmed on the first display, and the focus can be accurately confirmed on the second display, so that the operability is excellent and an image can be efficiently captured.

As described above, the invention intends to solve the problems in the conventional techniques and provides an electronic camera and a display system capable of confirming both an image capturing range and focus and efficiently capturing an image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flowchart showing the procedure of an initial setting when power is turned on;

FIG. 14 is a partial block diagram of a digital camera according to the second preferred embodiment.

DESCRIPTION OF THE PREFERRED EMBODIMENTS

Preferred embodiments of the invention will be described hereinbelow with reference to the drawings.

1. First Preferred Embodiment

<Configuration of Digital Camera>

Figure 1:
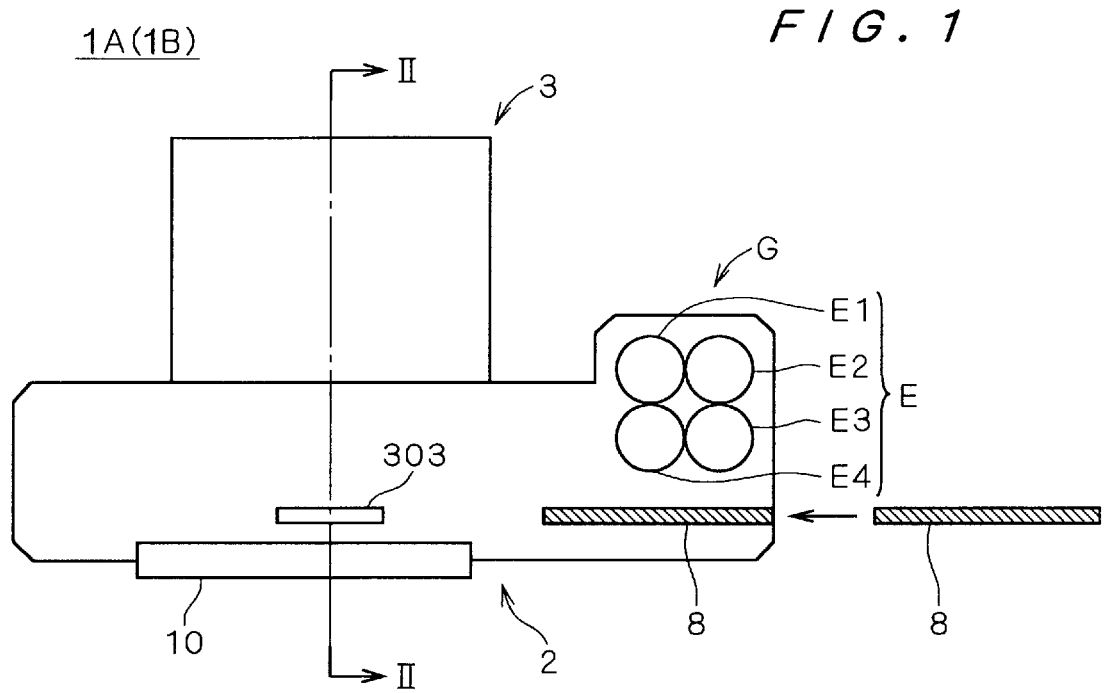
FIG. 1 is a plan view showing the configuration of a digital camera 1A according to a preferred embodiment of the invention.
Figure 2:
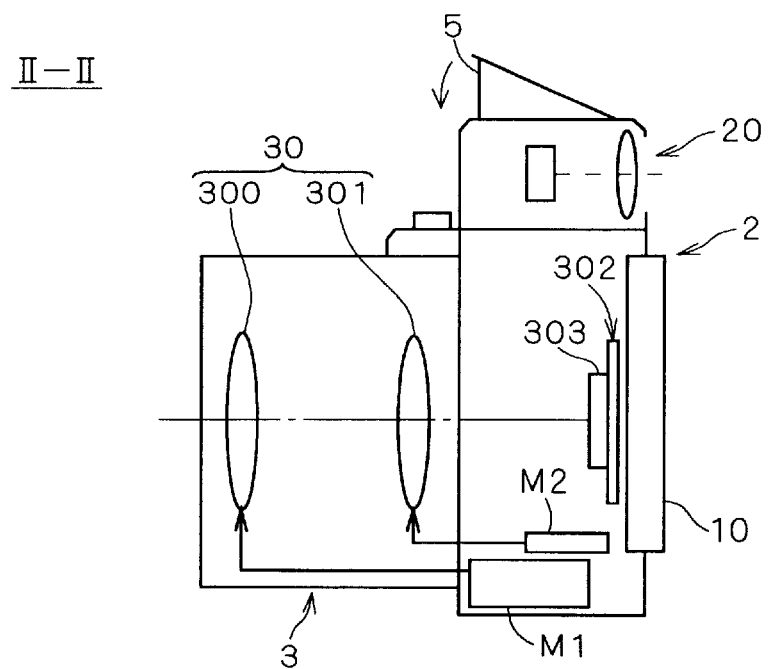
FIG. 2 is a cross section taken along the line II—II of FIG. 1.
Figure 3:
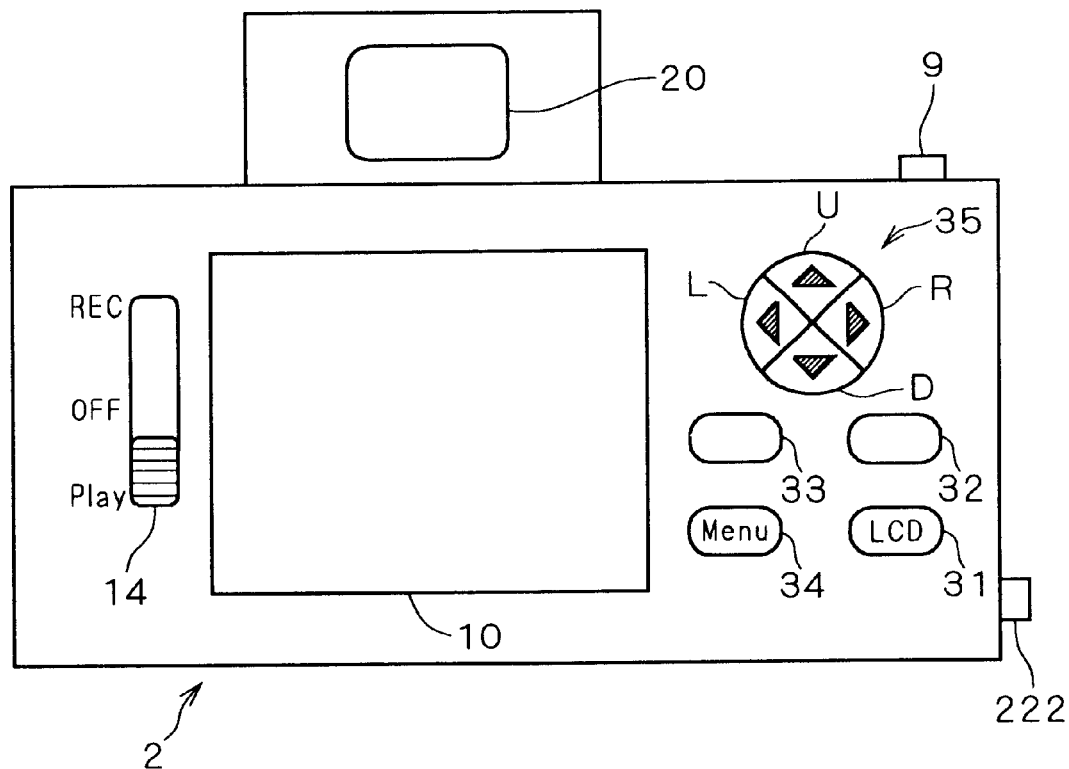
FIG. 3 is a rear view showing the configuration of the digital camera 1A according to the preferred embodiment of the invention.

FIGS. 1 to 3 are diagrams each showing the configuration of a digital camera 1A (1B) according to a preferred embodiment of the invention. FIG. 1 is a plan view, FIG. 2 is a cross section taken along the line II—II of FIG. 1, and FIG. 3 is a rear view. The drawings are not always according to triangular diagrams but mainly aim at conceptually showing the configuration of the digital camera 1A as an example.

As shown in the diagrams, the digital camera 1A has a structure mainly divided into a camera body 2 having an almost rectangular parallelepiped shape and an image pickup unit 3.

The image pickup unit 3 is provided with an image pickup circuit 302 having a CCD color area sensor 303 in a proper position behind a lens group 30 having a macro function as image pickup lenses. The lens group 30 includes a zoom lens 300 and a focusing lens 301.

On the other hand, the camera body 2 has therein a motor M1 for zooming which changes the zoom ratio of the zoom lens 300 and moves the zoom lens 300 between an enclosed position and an image pickup position and a motor M2 for obtaining focus by driving the focusing lens 301.

A grip G is provided on the front face of the camera body 2. In a proper position at the upper end of the camera body 2, a pop-up type built-in flash 5 is provided. A shutter button 9 is provided on the top face of the camera body 2.

On the other hand, as shown in FIG. 3, a liquid crystal display (LCD) 10 and an electronic view finder (EVF) 20 for displaying a live view of a captured image, reproducing a recorded image, and the like in an almost center position are provided on the rear face of the camera body 2. The LCD 10 has a width of 4 cm and a length of 3 cm. The EVF 20 enlargedly displays a liquid crystal display having a width of 1.2 cm and a length of 0.9 cm by an eyepiece. In the LCD 10 and the EVF 20, an image is displayed in color. On the rear face of the camera body 2, an image capturing/ reproducing mode setting switch 14 for switching and setting "image capturing mode (REC mode)" and "reproducing mode (Play mode)" is provided. The image capturing mode is a mode of taking a picture, and the reproducing mode is a mode of reproducing and displaying the captured image recorded in a memory card 8 onto the LCD 10. The image capturing/reproducing mode setting switch 14 is slidable in the vertical direction. When the switch 14 is positioned on the upper side, the image capturing mode is set. When the switch 14 is positioned on the lower side, the reproducing mode is set. When the switch 14 is positioned in the middle, the power can be turned off.

A four-way switch 35 is provided on the right side of the rear face of the digital camera 1A. By pressing the buttons L and R, the motor M1 is driven for zooming. By pressing buttons U, D, L, and R, various operations which will be described hereinlater are performed.

An LCD button 31, a determination button 32, a cancellation button 33, and a menu button 34 are provided on the rear face of the camera body 2. The LCD button 31 is a button to turn on/off the LCD display or the EVF display. Each time the LCD button 31 is depressed, the display mode is switched between the LCD display and the EVF display (which will be described in detail hereinlater).

On a side face of the camera body 2, an external monitor terminal 222 is provided. The external monitor terminal 222 is a terminal for transferring image data from the digital camera 1A to an external monitor 223 (refer to FIG. 4).

As shown in FIG. 1, the memory card 8 can be inserted to the digital camera 1A. The digital camera 1A uses a power supply battery E in which four AA cells E1 to E4 are connected in series as a drive source.

<Functional Blocks of Digital Camera 1A>

Figure 4:
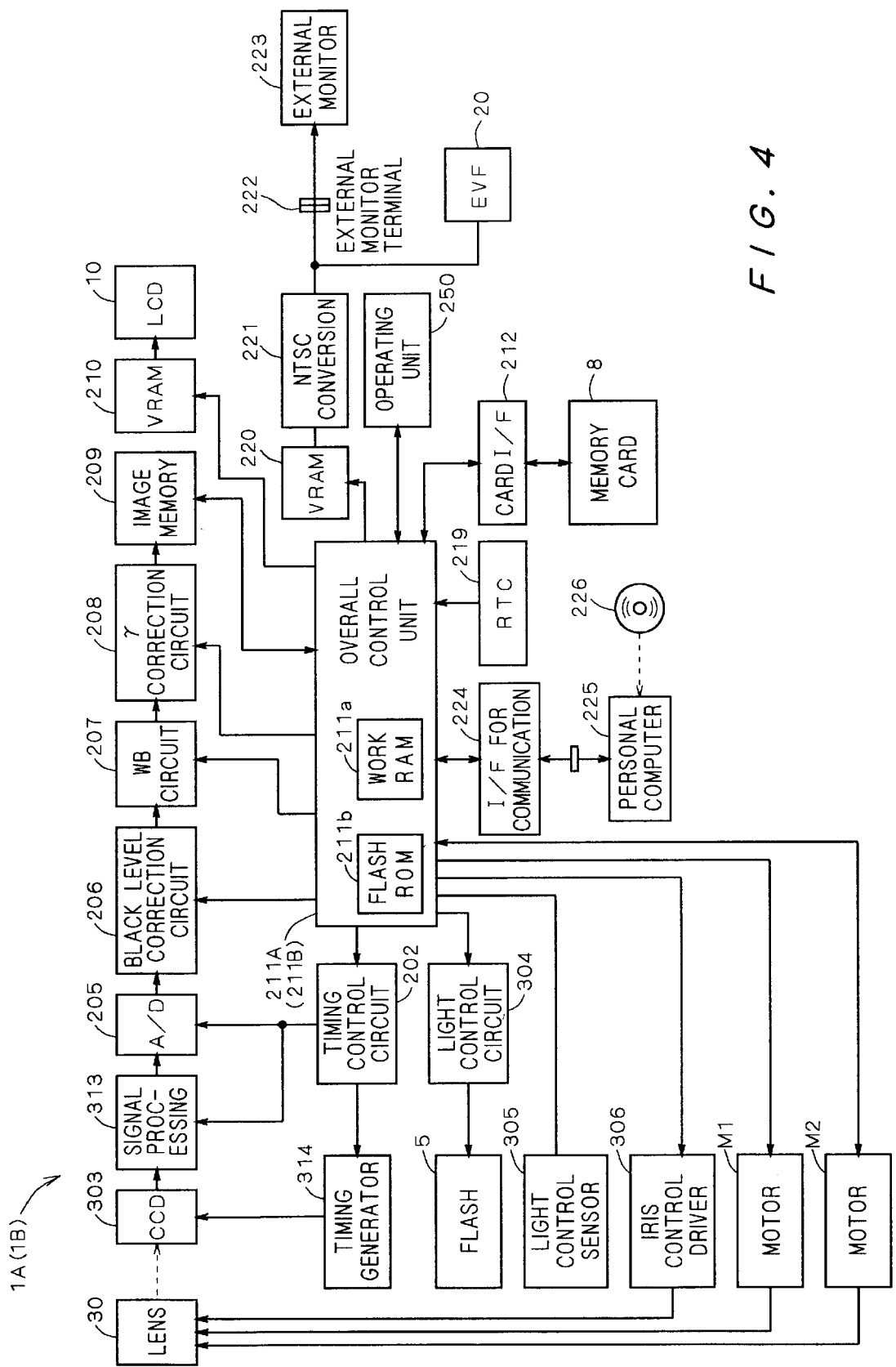
FIG. 4 is a functional block diagram of the digital camera 1A.

FIG. 4 is a functional block diagram of the digital camera 1A. In FIG. 4, a CCD 303 photoelectrically converts an optical image of a subject formed by the lens group 30 into an image signal (made by a signal train of pixel signals received by pixels) of color components of R (red), G (green), and B (blue) and outputs the image signal. A timing generator 314 generates various timing pulses for controlling the driving of the CCD 303.

An exposure control in the image pickup unit 3 is performed by adjusting the aperture size of the lens group 30 by an aperture control driver 306 and exposure of the CCD 303 by the timing generator 314, that is, charge storing time of the CCD 303 corresponding to a shutter speed. In the case where a proper shutter speed cannot be set when the luminance of the subject is low, by adjusting the level of the image signal outputted from the CCD 303, improper exposure due to insufficient exposure is corrected. In other words, at the time of low luminance, the exposure control is performed by adjusting both the shutter speed and the gain adjustment. The level adjustment of the image signal is performed by adjusting the gain of an AGC circuit in a signal processing circuit 313.

The timing generator 314 generates a control signal for driving the CCD 303 on the basis of a reference clock transmitted from a timing control circuit 202. The timing generator 314 generates, for example, a timing signal of start/end of integration (start/end of exposure), read control signals of photoreception signals of pixels (horizontal synchronizing signal, vertical synchronizing signal, transfer signal, and the like), and the like and outputs the generated signal to the CCD 303.

The signal processing circuit 313 performs a predetermined analog signal process on an image signal (analog signal) outputted from the CCD 303. The signal processing circuit 313 has a CDS (correlation double sampling) circuit and an AGC (automatic gain control) circuit, reduces noises of the image signal by the CDS circuit, and adjusts the level of the image signal by adjusting the gain of the AGC circuit.

A light control circuit 304 controls a light emission amount of the built-in flash 5 in flash shooting to a predetermined light emission amount set by an overall control unit 211A. In the flash shooting, simultaneously with start of exposure, reflection light of flash light from the subject is received by a light control sensor 305. When the light receiving amount reaches a predetermined light emission amount, a light emission stop signal is outputted from the light control circuit 304, and the light emission of the built-in flash 5 is forcedly stopped in response to the light emission stop signal, thereby controlling the light emission amount of the built-in flash 5 to the predetermined light emission amount.

An A/D converter 205 converts each of pixel signals of the image signal to a 12-bit digital signal. The A/D converter 205 converts each pixel signal (analog signal) to a 12-bit digital signal on the basis of a clock for A/D conversion supplied from the timing control circuit 202.

The timing control circuit 202 is provided to generate clocks to the timing generator 314 and the A/D converter 205. The timing control circuit 202 is controlled by a reference clock in the overall control unit 211A.

A black level correcting circuit 206 corrects the black level of the pixel signal which has been subjected to the A/D conversion to a reference black level. A WB (white balance) circuit 207 shifts the level of pixel data of color components of R, G, and B. The WB circuit 207 shifts the level of the pixel data of each of color components of R, G, and B by using a level shifting table supplied from the overall control unit 211A. A shift coefficient (gradient of characteristic) of each color component (hereinbelow, called a "WB parameter") in the level shifting table is automatically or manually set every captured image by the overall control unit 211A.

A γ correction circuit 208 corrects the gradation of the pixel data. The γ correction circuit 208 performs correction adapted to the γ characteristics of a monitor for a general personal computer.

An image memory 209 is a memory for storing the pixel data outputted from the γ correction circuit 208. The image memory 209 has a storage capacity of one frame. Specifically, the image memory 209 has a storage capacity of pixel data of 1600×1200 pixels corresponding to the number of pixels of the CCD 303 and each pixel data is stored in a corresponding pixel position.

A VRAM 210 is a buffer memory of image data to be displayed on the LCD 10. The VRAM 210 has a storage capacity of image data corresponding to the number of pixels (400×300) of the LCD 10.

A VRAM 220 is a buffer memory of image data to be displayed on the EVF 20. The VRAM 220 has a storage capacity of image data corresponding to the number of pixels (640×480) of the EVF 20.

In an image capturing standby state, each of pixel data of an image captured every 1/30 second by the image pickup unit 3 is subjected to predetermined signal processes by the A/D converter 205, black level correcting circuit 206, WB circuit 207, and γ correcting circuit 208. After that, resultant data is temporarily stored in the image memory 209, also transferred to the VRAMs 210 and 220 via the overall control unit 211A, and displayed on the LCD 10 and the EVF 20 (live view display).

Consequently, the user can visually recognize the image of the subject. In a reproduction mode, an image read from the memory card 8 is subjected to a predetermined signal process by the overall control unit 211A. After that, a resultant image is transferred to the VRAM 210 and is reproduced and displayed on the LCD 10. An image is similarly displayed also on the EVF 20.

A card I/F 212 is an interface for writing and reading image data to/from the memory card 8. An I/F 224 for communication is an interface conformed to, for example, the USB standard for connecting a personal computer 225 to the outside for communications. Control programs recorded on recording media such as the memory card 8 and a CD-ROM 226 can be loaded into the overall control unit 211A via the card I/F 212 and the I/F 224 for communication.

An RTC 219 is a clock circuit for managing date and time of image capturing and is driven by another power source (not shown).

An operating unit 250 is constructed by the above-described various switches, buttons, and the like such as the shutter button 9, LCD button 31, and determination button 32.

The shutter button 9 is a switch of two levels capable of detecting a half-pressed state and a fully-pressed state, which is adopted in a camera for silver halide film. When the shutter button 9 is half-pressed in a standby state, automatic focusing control (AF), automatic exposure (AE), and white balance (WB) adjustment are performed under the control of the overall control unit 211A as will be described hereinlater.

An NTSC converter 221 converts an image signal stored in the VRAM 220 into a signal of the NTSC system format and transfers a resultant signal to the EVF 20 and the external monitor 223 via the external monitor terminal 222. In a state where the external monitor 223 is connected to the external monitor terminal 222, the same image as that on the EVF 20 is displayed on the external monitor 223.

The overall control unit 211A takes the form of a microcomputer having therein a work RAM 211a made by a DRAM, a flash ROM 211b and CPU, organically controls the driving of the above-described members of the digital camera 1A, and has centralized control of image capturing operations of the digital camera 1A.

Figure 5:
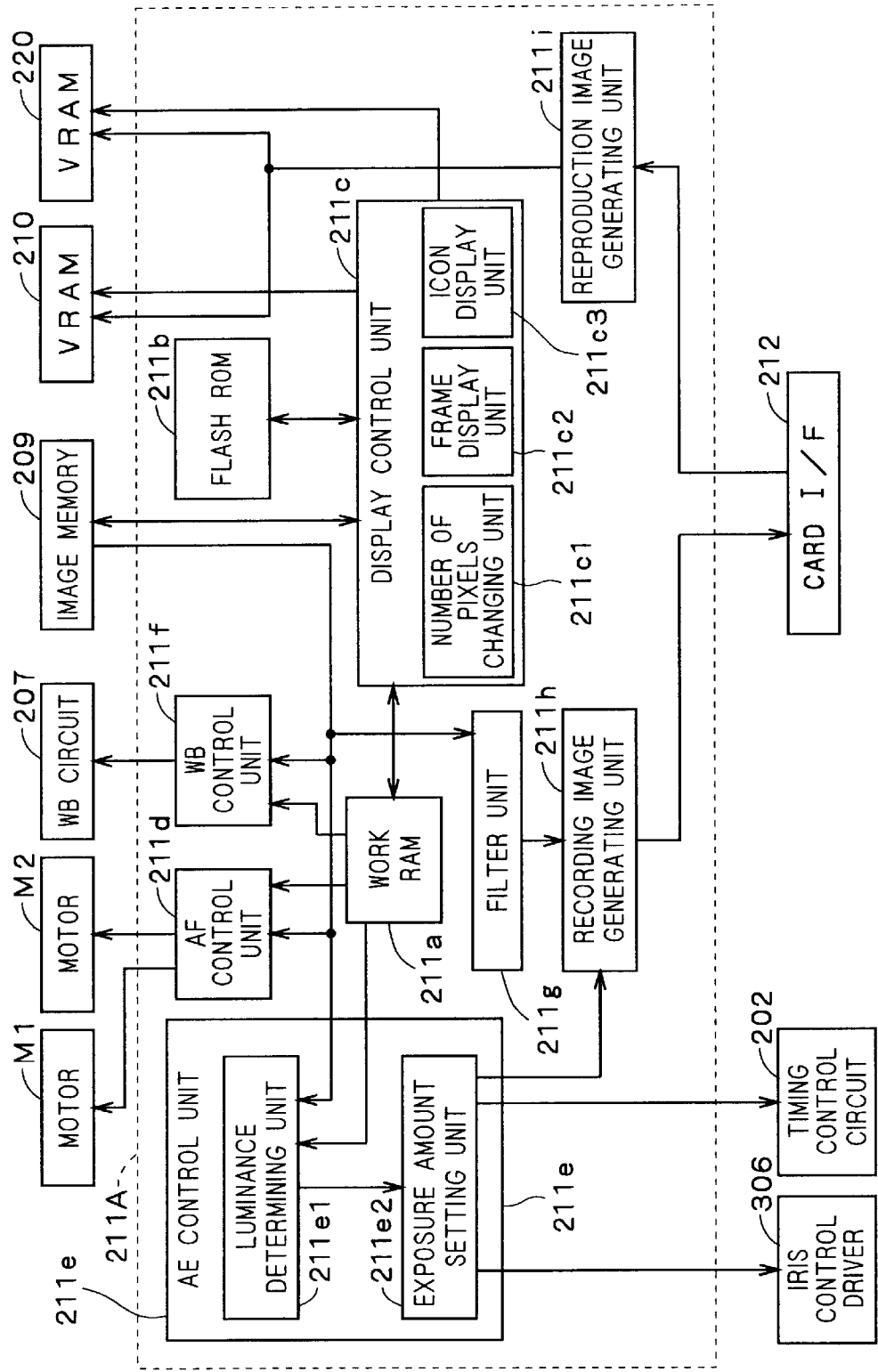
FIG. 5 is a block diagram showing the internal functions realized by the whole including an CPU and memories in an overall control unit 211A.

FIG. 5 is a block diagram showing internal functions realized by the whole including a CPU and memories in the overall control unit 211A. The overall control unit 211A has a display control unit 211c. In an image capturing mode, the display control unit 211c performs a display control of the LCD 10 and the EVF 20 in accordance with each of the zeroth to fourth display modes on the basis of a mode set value which will be described hereinlater. When the power of the digital camera 1A is OFF, the display control unit 211c stores the mode set value s, an EVF display magnification m, and the like into the flash ROM 211b. On the contrary, when the power of the digital camera 1A is ON, the display control unit 211c reads the mode set value s, the EVF display magnification m, and the like at the time of turn-off of the power last time from the flash ROM 211b and, in accordance with the read values, performs the display control of the LCD 10 and the EVF 20 in the display mode and the magnification at the time of turn-off of the power last time.

The display control unit 211c has a unit 211c1 for changing the number of pixels (hereinbelow, number of pixels changing unit), a frame display unit 211c2, and an icon display unit 211c3.

In the third display mode (which will be described hereinlater) for enlargedly displaying an image in the central area of the LCD 10 onto the EVF 20, the number of pixels changing unit 211c1 stores image data which has been subjected to a thinning (interpolating) process which will be described hereinlater into the work RAM 211a and the VRAM 220, thereby displaying an enlarged image obtained by enlarging the central area of an image by the EVF 20.

The frame display unit 211c2 superimposes a frame image on image data read from the image memory 209 and writes a resultant image into the VRAM 210 so as to display an image of a frame (which will be described hereinlater)

indicative of a range of an image displayed on the EVF 20 in the third display mode onto the LCD 10.

The icon display unit 211c3 superimposes an enlarged display icon (which will be described hereinlater) indicating that the central area of the image is enlargedly displayed on the EVF 20 in the third display mode on the image data to be displayed on the LCD 10 and writes a resultant image onto the VRAM 210.

An AF control unit 211d, an AE control unit 211e, and a WB control unit 211f are connected to the display control unit 211c. When the shutter button 9 is half-pressed in the image capturing mode, the display control unit 211c controls those control units so as to perform AF, AE, and WB, respectively, with reference to image data in the image memory 209 in the zeroth, first, second and fourth display modes which will be described hereinlater and with reference to the image data in the work RAM 211a in the third display mode.

The AF control unit 211d achieves focus by reading out image data stored in the image memory 209 or the work RAM 211a, and moving the lenses by driving the motors M1 and M2 so that the contrast of the image becomes the highest. At this time, as a control method to make the contrast the highest, a known technique such as hill-climbing or the like can be used.

The AE control unit 211e has therein a luminance determining unit 211e1 and an exposure amount setting unit 211e2 for setting exposure control values (shutter speed (SS) and aperture value). The luminance is obtained from image data stored in the image memory 209 or the work RAM 211a by the luminance determining unit 211e1. The exposure amount setting unit 211e2 adjusts the exposure by setting an aperture value and SS adapted to the aperture control driver 306 and the timing control circuit 202.

The WB control unit 211f obtains WB parameters from the image data stored in the image memory 209 or the work RAM 211a and sets the WB parameters in a WB circuit 207. With the WB parameters, the WB circuit 207 performs a WB process on the image data obtained by the CCD 303.

Further, in order to perform a process of recording the captured image, the overall control unit 211A has a filter unit 211g for performing a filtering process and a recording image generating unit 211h for generating a thumbnail image and a compressed image. In order to reproduce the image recorded on the memory card 8 onto the LCD 10 and EVF 20, the overall control unit 211A has a reproduction image generating unit 211i for generating a reproduction image.

The filter unit 211g is used to correct the picture quality regarding an edge of subject by correcting high frequency components of an image to be recorded by a digital filter.

The recording image generating unit 211h reads pixel data from the image memory 209 and generates a thumbnail image and a compressed image to be recorded in the memory card 8. The recording image generating unit 211h reads the pixel data every 8 pixels in both of the lateral and vertical directions from the image memory 209 and sequentially transfers the read pixel data to the memory card 8, thereby recording the thumbnail image to the memory card 8 while generating the thumbnail image.

The recording image generating unit 211h reads all of pixel data from the image memory 209, performs a predetermined compressing process according to the JPEG system such as two-dimensional DCT or Huffman coding on the pixel data to thereby generate image data of a compressed image, and records the compressed image data into a main image area in the memory card 8.

When image capture is instructed by the shutter button 9 in the image capturing mode, the overall control unit 211A generates a thumbnail image of an image captured in the image memory 209 after the instruction of the image capture and a compression image compressed according to the JPEG system at a set compression ratio, and stores both of the images with information such as tag information related to the captured image (frame number, exposure value, shutter speed, compression ratio, date of image capture, data related to on/off of a flash at the time of image capture, scene information, determination result of an image, and the like) into the memory card 8.

In each of the frames of the image recorded by the digital camera 1A, the tag portion, high-resolution image data (1600×1200 pixels) compressed in the JPEG system, and image data (80×60 pixels) for displaying a thumbnail image are recorded.

When the image capturing/reproducing mode setting switch 14 is set to the reproducing mode, image data of the largest frame number in the memory card 8 is read and decompressed by the reproduction image generating unit 211i, and the resultant data is transferred to the VRAMs 210 and 220, thereby displaying an image of the largest frame number, that is, an image most recently captured on the LCD 10 or EVF 20. By operating the button U, an image of a larger frame number is displayed. By pressing the button D, an image of a smaller frame number is displayed.

Figure 6:
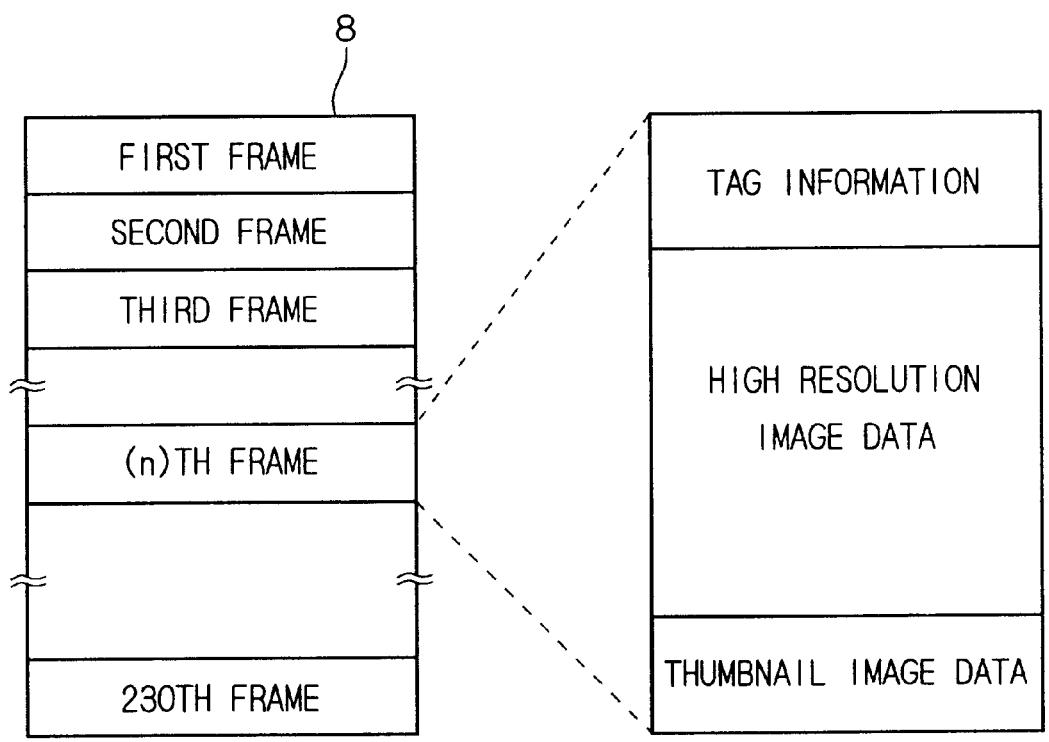
FIG. 6 is a diagram showing data arrangement of a memory card.

FIG. 6 is a diagram showing data arrangement of the memory card 8. As shown in FIG. 6, the memory card 8 can store images stored by the digital camera 1A of 230 frames at a compression ratio of 1/20. In each of the frames, tag information, high resolution image signals (640×480 pixels) compressed in the JPEG system, and image signals (80×60 pixels) for displaying a thumbnail image are recorded. The signals can be dealt as an image file of, for example, an EXIF format on a frame unit basis.

<Display Control in Image Capturing Mode>

A display control in the image capturing mode of the digital camera 1A according to the preferred embodiment will be described hereinbelow.

Figure 7:
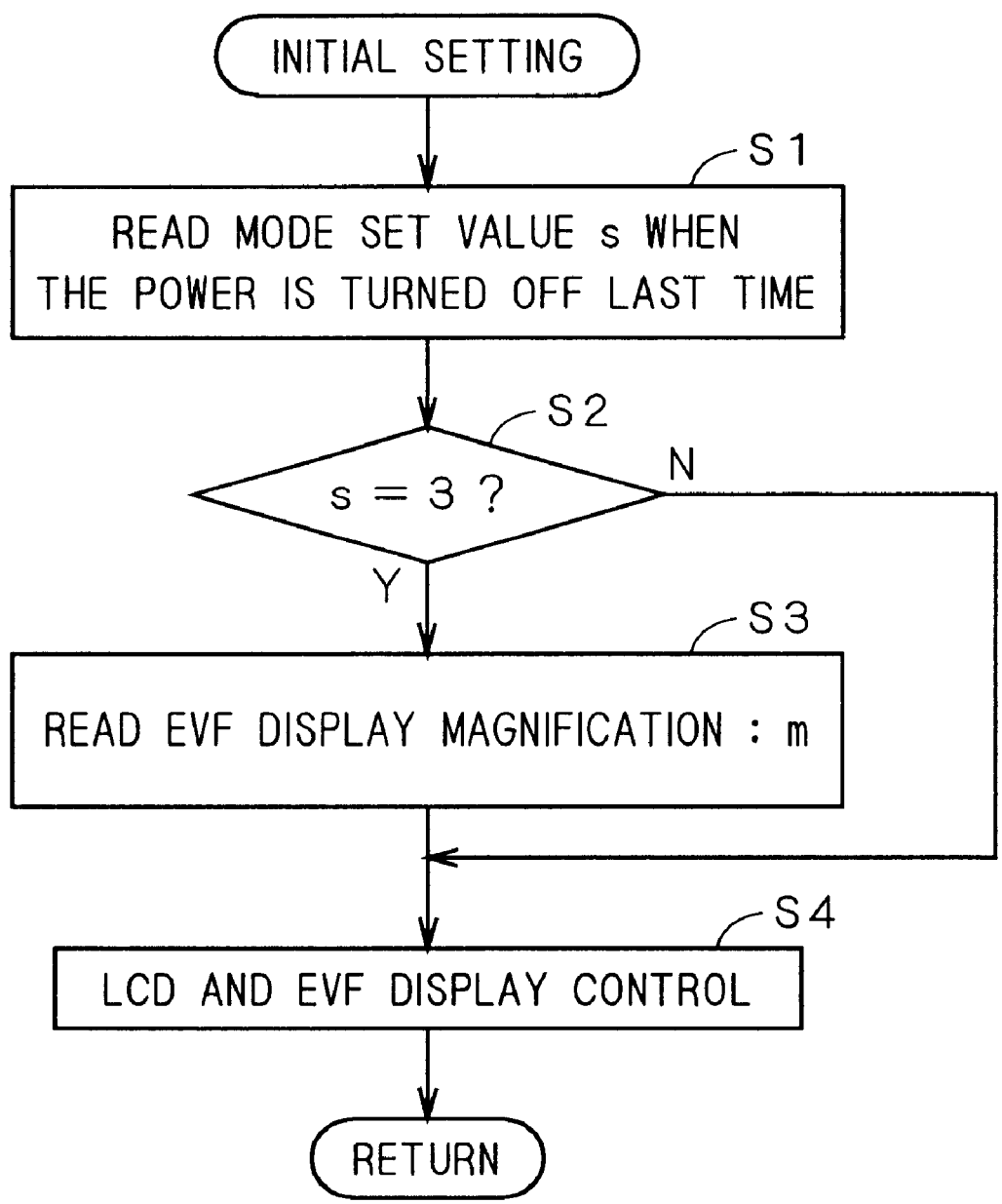

When the power is turned on in a state where the digital camera 1A is set in the image capturing mode, first, a process of initial setting is performed. FIG. 7 is a flowchart showing a procedure of the initial setting when the power is turned on. The process is performed by the display control unit 211c.

First, the mode set value (s) at the time of turn-off of the power last time is read from the flash ROM 211b (step S1 in FIG. 7). The mode set value is a value for designating the display mode of the EVF 20 and the LCD 10 in the image capturing mode. In the digital camera 1A, the mode set value (s) varies from "0" to "4". The display modes designated by the mode set values (s) from "0" to "4" are called the zeroth to fourth display modes, respectively, hereinbelow. In the zeroth to fourth display modes, the display states of the EVF 20 and the LCD 10 are as shown in Table 1.

TABLE 1

| Mode set values (Display mode) | EVF | LCD |
| --- | --- | --- |
| 0 (zeroth display mode) | Live view display m = 1 | Off |
| 1 (first display mode) | Off | Live view display |
| 2 (second display mode) | Live view display m = 1 | Live view display |
| 3 (third display mode) | Live view display (central area enlargedly display) m: Set value | Live view display (frame and enlarged display icon display) |

TABLE 1-continued

| Mode set values (Display mode) | EVF | LCD |
|---|---|---|
| 4 (fourth display mode) | Live view display m = 1 | Camera status display |

In Table 1, the EVF display magnification (m) expresses a display magnification for an image displayed on the LCD 10 of the image displayed on the EVF 20.

The mode set value s=0 (zeroth display mode) is a display mode in which the EVF 20 displays a live view (m=1) and the LCD 10 is OFF.

The mode set value s=1 (first display mode) is a display mode in which the EVF 20 is OFF and the LCD 10 displays a live view.

The mode set value s=2 (second display mode) is a display mode in which the EVF 20 displays a live view (m=1) and the LCD 10 displays a live view.

The mode set value s=3 (third display mode) is a display mode in which the EVF 20 displays a live view (by enlargedly displaying the central area and setting the EVF display magnification (m) to a set value) and the LCD 10 displays a live view (with a display area frame of the EVF 20).

The mode set value s=4 (fourth display mode) is a display mode in which the EVF 20 displays a live view (m=1) and the LCD 10 displays a camera status as information regarding an image capturing mode setting state.

Subsequently, whether the mode set value (s) is "3" or not is determined (step S2 in FIG. 7). When YES, the program advances to step S3. When NO, the program advances to step S4.

In the case where the mode set value (s) is 3, the EVF display magnification (m) at the time of turn-off of the power last time which is stored in the flash ROM 211b (the data corresponds to area data at the time of turn-off) is read (step S3 in FIG. 7).

Whether an image is displayed or not in the LCD 10 and the EVF 20 is controlled in practice on the basis of the setting (step S4 in FIG. 7).

After that, the initial setting process upon turn-on of the power is finished. As described above, the digital camera 1A in the preferred embodiment displays an image on the EVF 20 in the display mode and the EVF display magnification at the time of turn-off of the power last time, so that the area in the whole image displayed on the EVF 20 is the same as that at time of the turn-off of the power last time.

Figure 8:
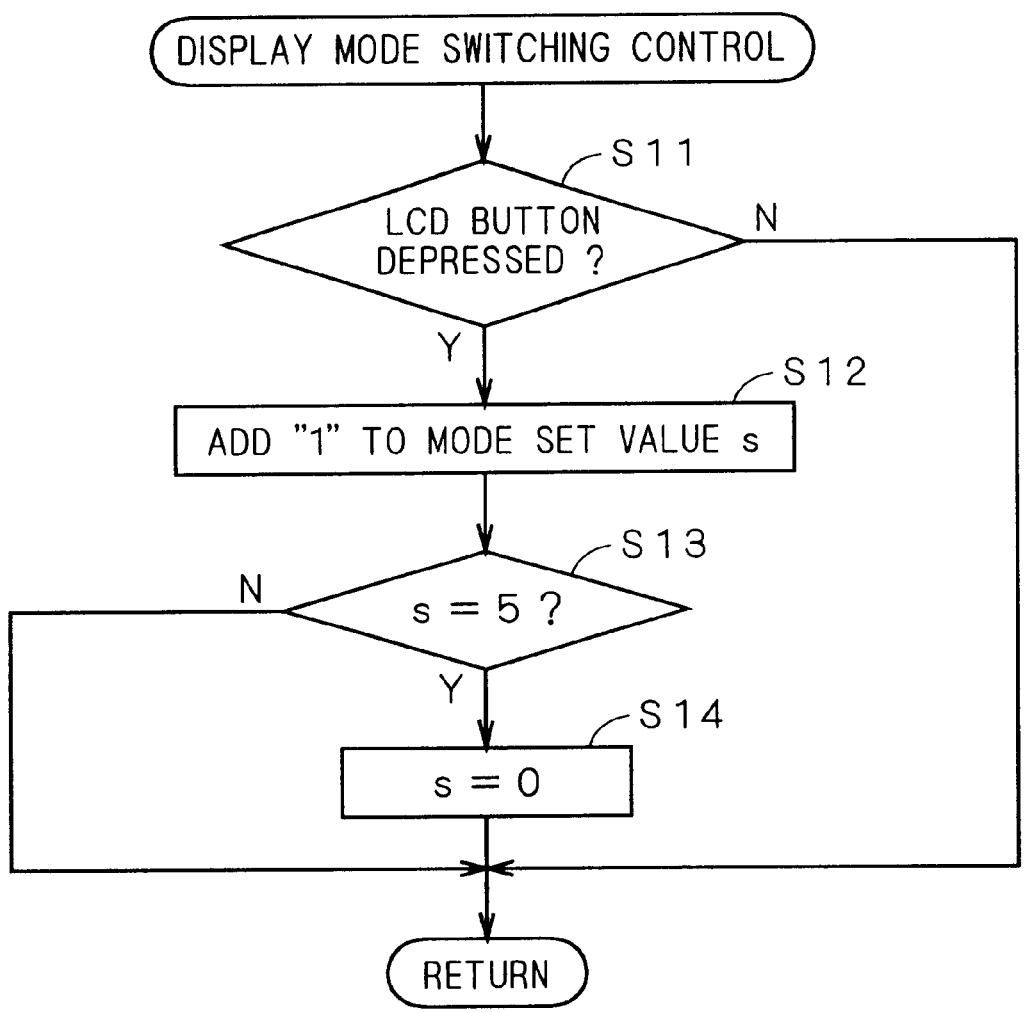
FIG. 8 is a flowchart showing the procedure of a display mode switching control process.

The display mode switching control will now be described. FIG. 8 is a flowchart showing the procedure of the display mode switching process. In the digital camera 1A, each time the LCD button 31 is pressed, "1" is added to the mode set value so as to switch the display mode. A control of returning the mode set value to "0" when the mode set value reaches "5" is performed by the display control unit 211c.

First, whether the LCD button 31 is depressed or not is determined (step S11 in FIG. 8). When NO, the display mode switching control process is finished. When YES, the program advances to the next step.

Subsequently, "1" is added to the mode set value (s) (step S12 in FIG. 8).

Whether the mode set value (s) is 5 or not is determined (step S13 in FIG. 8). When the mode set value is not "5", the display mode switching control process is finished. When YES, the program advances to the next step.

The mode set value (s) is set to "0" (step S14 in FIG. 8). After that, the display mode switching control process is finished.

As described above, the digital camera 1A can perform various displays by the LCD 10 and the EVF 20. The number of pixels of captured image data, the number of pixels in the LCD 10, and the number of pixels in the EVF 20 are different from each other. In order to display an image on the EVF 20 or the LCD 10, it is therefore necessary to perform a process of thinning or interpolating the image data. The number of pixels changing unit 211c1 consequently reads out image data in the image memory 209 and perform the process of thinning (interpolating) the data. The process of thinning image data to be displayed on the EVF 20 or the LCD 10 will be described hereinbelow. The thinning (interpolating) process is performed by the number of pixels changing unit 211c1 in the display control unit 211c.

When the enlarged display in the EVF 20 is not performed, a thinning process to a quarter is performed on image data having pixels of 1600×1200 in the image memory 209 (by leaving only one pixel every four pixels and deleting the other pixels), and the resultant data is stored in the VRAM 210 as image data of 400×300 pixels, thereby displaying the image on the LCD 10. A thinning process to 2/5 (by leaving only two pixels out of five pixels and deleting the other pixels) is performed on image data of 1600×1200 pixels in the image memory 209 and storing the resultant image data as image data of 640×480 pixels into the VRAM 220, thereby displaying the image data on the EVF 20.

The interpolating or thinning process of image data executed in the mode set value (s) of 3 (third display mode), that is, at the time of enlargedly displaying the central area of a displayed image on the LCD 10 by the EVF 20 will now be described.

Figure 9B:
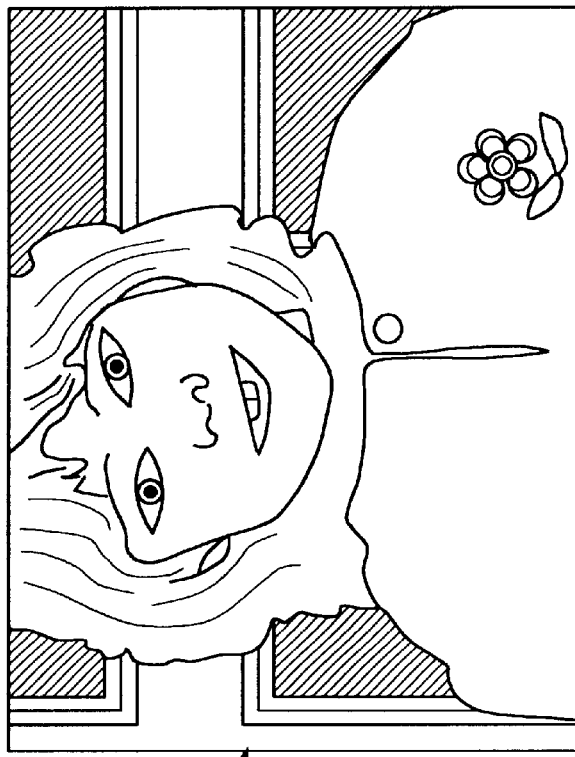
FIGS. 9A and 9B illustrate a display screen on an LCD and a display screen on an EVF, respectively, in a third display mode.
Figure 9A:
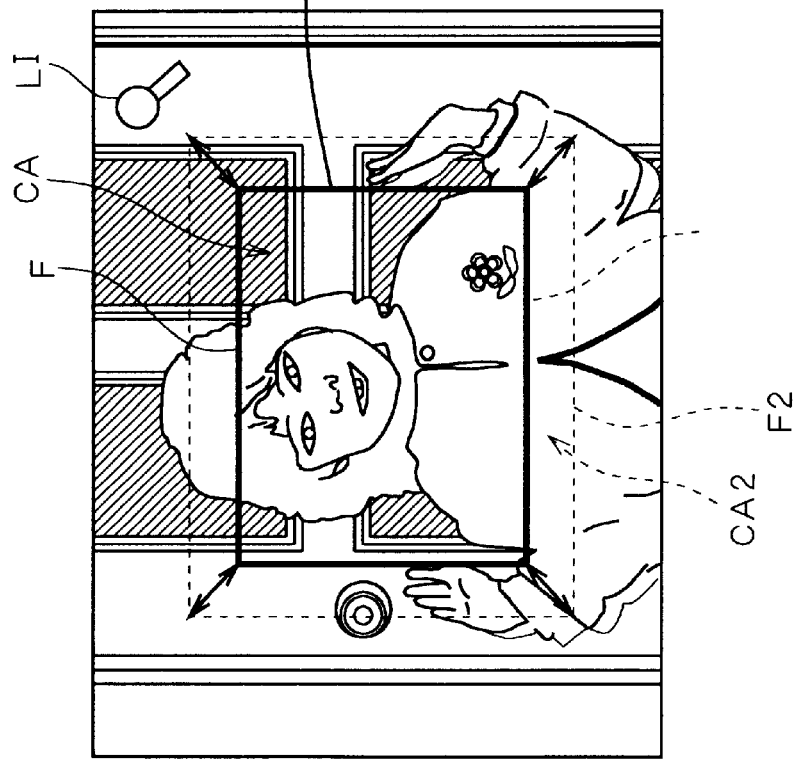

FIG. 9A shows a display screen of the LCD 10 in the third display mode. FIG. 9B shows a display screen of the EVF 20 displaying an image obtained by enlarging the central area of the display image on the LCD 10 by twice. In the digital camera 1A according to the preferred embodiment, the LCD 10 has 400×300 pixels and the EVF 20 has 640×480 pixels. In the case of enlargedly displaying an image on the EVF 20, the LCD 10 displays a whole image and superimposes the image in a frame F in the central area CA corresponding to the display range of the EVF 20. Specifically, by writing image data in the frame F into an area of Int(400/m)×Int(300/m) pixels corresponding to the central area in the VRAM 210, the frame F is displayed. Int(a) is a function indicative of an integer part of a numerical value (a).

Further, the LCD 10 displays an enlarged display icon L1 indicative of the enlarged display mode (mode set value s=3) on the upper right part in the screen. For this purpose, image data of the enlarged display icon is written in the area of the VRAM 210 corresponding to the right upper part in the image.

In order to display an enlarged image on the EVF 20, the image data in the central area of only the Int(1600/m)×Int(1200/m) pixels in the image data of 1600×1200 pixels in the image memory 209 is developed to the work RAM 211a. The data in the work RAM 211a is subjected to a 2/5 m thinning (or interpolating) process and the resultant data is transferred to the VRAM 220. As described above, the AF control unit 211d, the AE control unit 211e, and the WB control unit 211f perform the AF control, AE control, and WB control, respectively, on the image data developed in the work RAM 211a.

When the user changes the EVF display magnification (m), the range of the central area is changed by a process as described above (to a central area CA2 or the like), the size of the frame is also changed (to a frame F2 or the like), and the display range on the EVF 20 is accordingly changed.

A display magnification setting process will now be described. In the case of changing the display magnification, the user presses the buttons L and R, thereby enabling the display magnification on the EVF 20 to be changed. The display control unit 211c decreases the value of m by one step (on the unit basis of 0.1) when the button L is pressed, and increases the value of m by one step (on the unit basis of 0.1) when the button R is pressed. (m) is set in a range from 1 to 10. The EVF display magnification (m) does not change to values out of the range. The procedure will be described hereinbelow.

Figure 10:
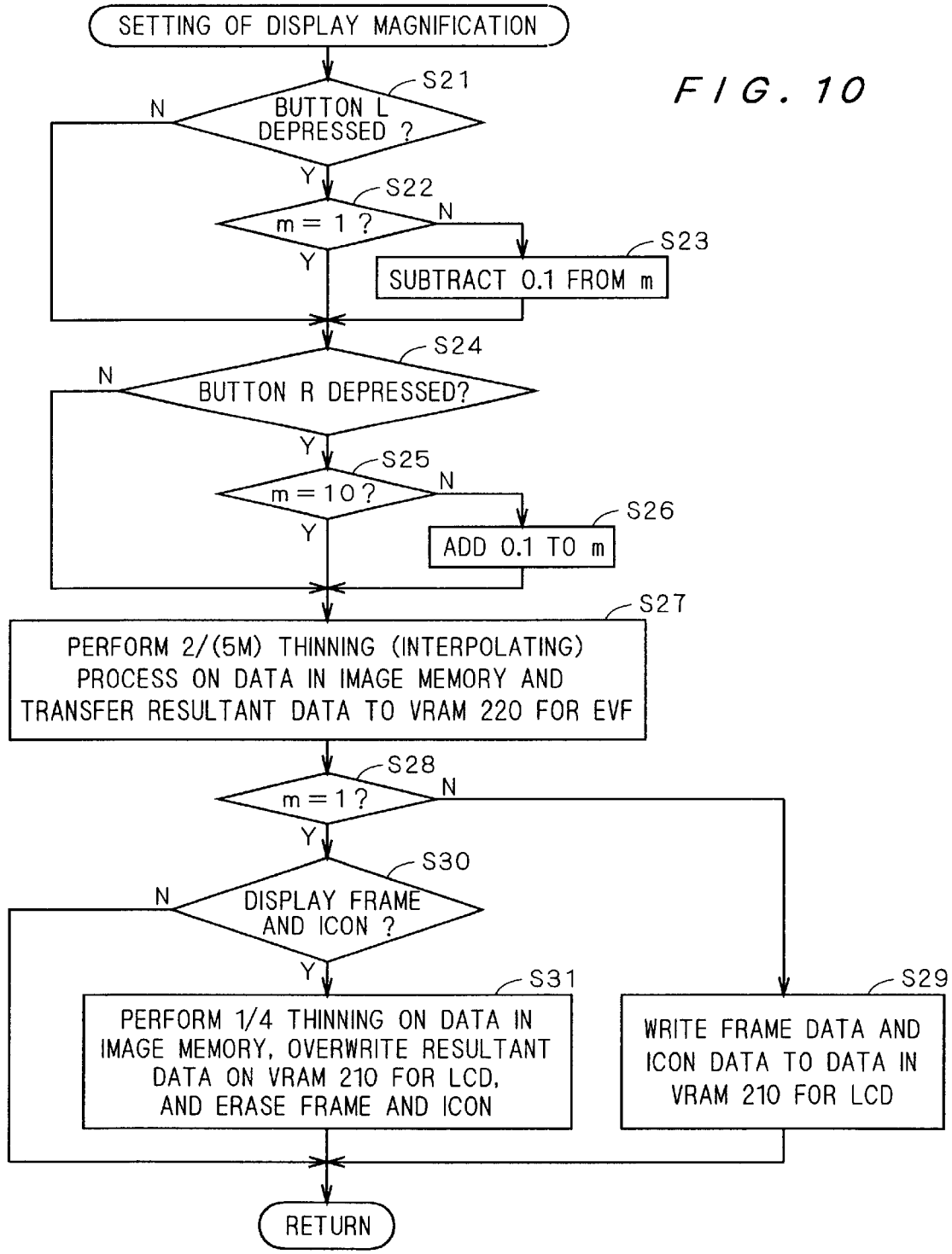
FIG. 10 is a flowchart showing the procedure of a display magnification setting process.

FIG. 10 is a flowchart showing the procedure of the display magnification setting process. The process is also performed by the display control unit 211c unless otherwise mentioned.

First, whether the button L is pressed or not is determined (step S21 in FIG. 10). When NO, the program advances to step S24. When YES, the program advances to the next step.

Whether the EVF display magnification (m) is 1 or not is determined (step S22 in FIG. 10). When YES, the program advances to step S24. When NO, the program advances to the next step.

"0.1" is subtracted from the EVF display magnification (m) (step S23 in FIG. 10).

Whether the button R is pressed or not is determined (step S24 in FIG. 10). When YES, the program advances to the next step. When NO, the program advances to step S27.

Whether the EVF display magnification (m) is "10" or not is determined (step S25 in FIG. 10). When YES, the program advances to step S27. When NO, the program advances to the next step.

"0.1" is added to the EVF display magnification (m) (step S26 in FIG. 10).

The number of pixels changing unit 211c1 performs a 2/5 m thinning (interpolating) process on the data in the image memory 209 and transfers the resultant data to the VRAM 220 (step S27 in FIG. 10).

Whether the EVF display magnification (m) is "1" or not is determined (step S28 in FIG. 10). When YES, the program advances to the next step. When NO, the program advances to step S29.

The frame display unit 211c2 writes the image data of the frame and the icon display unit 211c3 writes the image data of the enlarged display icon to the image data stored in the VRAM 210 (step S29 in FIG. 10), and the display magnification setting process is finished.

On the contrary, when it is determined in step S28 that the EVF display magnification (m) is "1", whether the frame and the enlarged display icon are displayed or not is determined (step S30 in FIG. 10). When YES, the program advances to the next step. When NO, the display magnification setting process is finished.

The number of pixels changing unit 211c1 performs the thinning of "1/4" on the image data in the image memory 209, overwrites the resultant data on the VRAM 210, and erases the frame and the enlarged display icon (step S31 in FIG. 10).

In the enlarged display mode (third display mode), the WB process, the AF process, and the AE process are performed on the image in the area (central area) displayed on the EVF 20. The procedure will be described hereinbelow.

Figure 11:
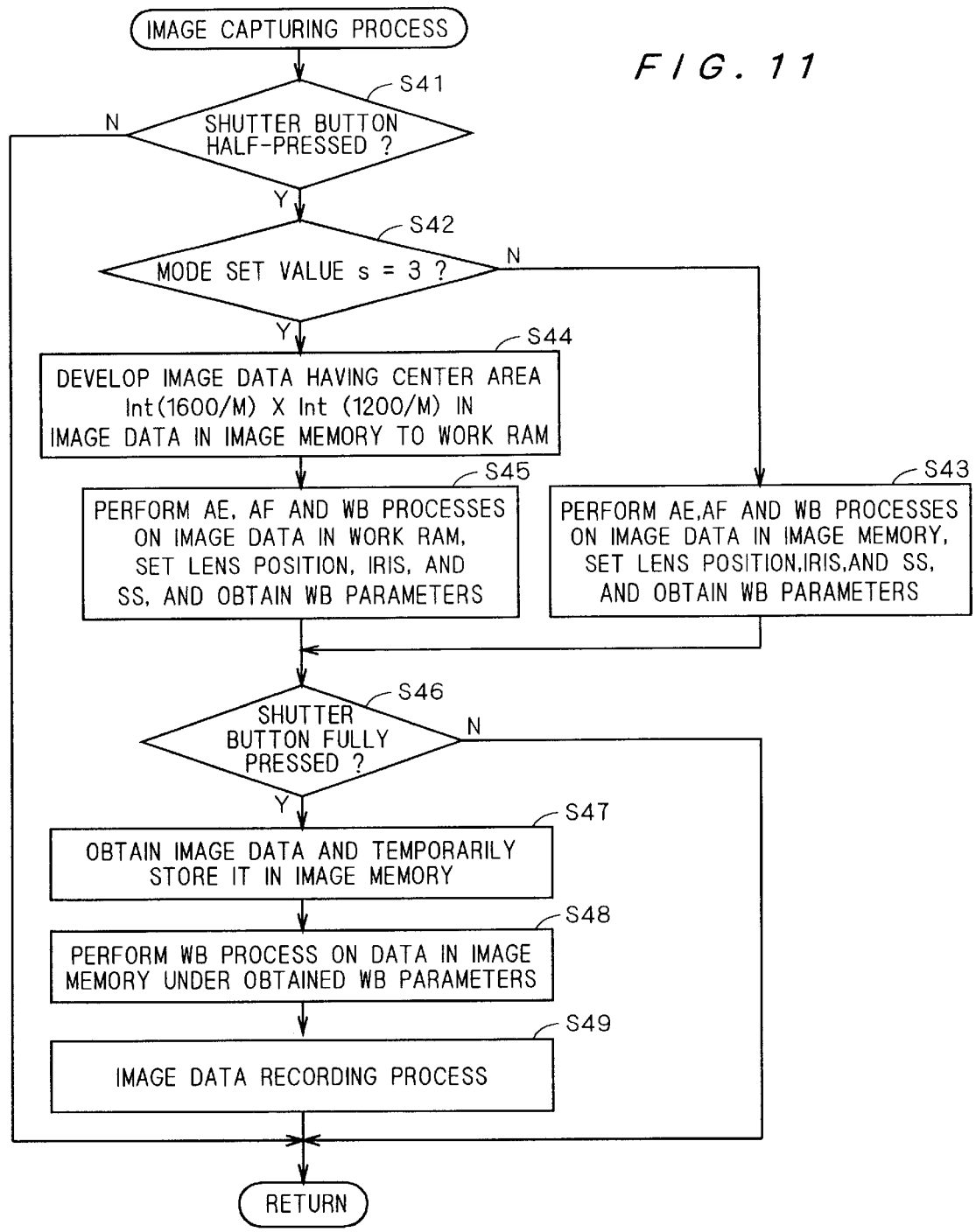
FIG. 11 is a flowchart showing the procedure of an image capturing process.

FIG. 11 is a flowchart showing the procedure of an image capturing process. The process is also performed by the display control unit 211c unless otherwise mentioned.

First, whether the shutter button 9 is half-pressed or not is determined (step S41 in FIG. 11). When YES, the program advances to the next step. When NO, the image capturing process is finished.

Whether the mode set value (s) is "3" or not is determined (step S42 in FIG. 11). When YES, the program advances to step S44. When NO, the program advances to step S43.

The AE, AF, and WB processes are performed on the image data in the image memory 209 under the control of the AF control unit 211d, AE control unit 211e, and WB control unit 211f, the lens position, aperture value, and shutter speed are set, and the WB parameters are obtained (step S43 in FIG. 11). After that, the program advances to step S46.

On the contrary, when it is determined in step S42 that the mode set value (s) is "3", the data in the central area of Int(1600/m)×Int(1200/m) pixels in the image data in the image memory 209 is developed to the work RAM 211a (step S44 in FIG. 11).

Subsequently, the AE, AF, and WB processes are performed on the image data in the work RAM 211a under the control of the AF control unit 211d, AE control unit 211e, and WB control unit 211f, the lens position, aperture value, and shutter speed are set, and the WB parameters are obtained (step S45 in FIG. 11).

Whether the shutter button 9 is fully pressed or not is determined (step S46 in FIG. 11). When YES, the program advances to the next step. When NO, the image capturing process is finished.

Subsequently, the image data is obtained and temporarily stored in the image memory 209 (step S47 in FIG. 11).

The WB circuit 207 executes the WB process on the image data in the image memory 209 with the WB parameters obtained by the WB control unit 211f (step S48 in FIG. 11).

Finally, the obtained image data is recorded in the memory card (step S49 in FIG. 11) and the image capturing process is finished.

An ending process when the power of the digital camera 1A is turned off will now be described.

Figure 12:
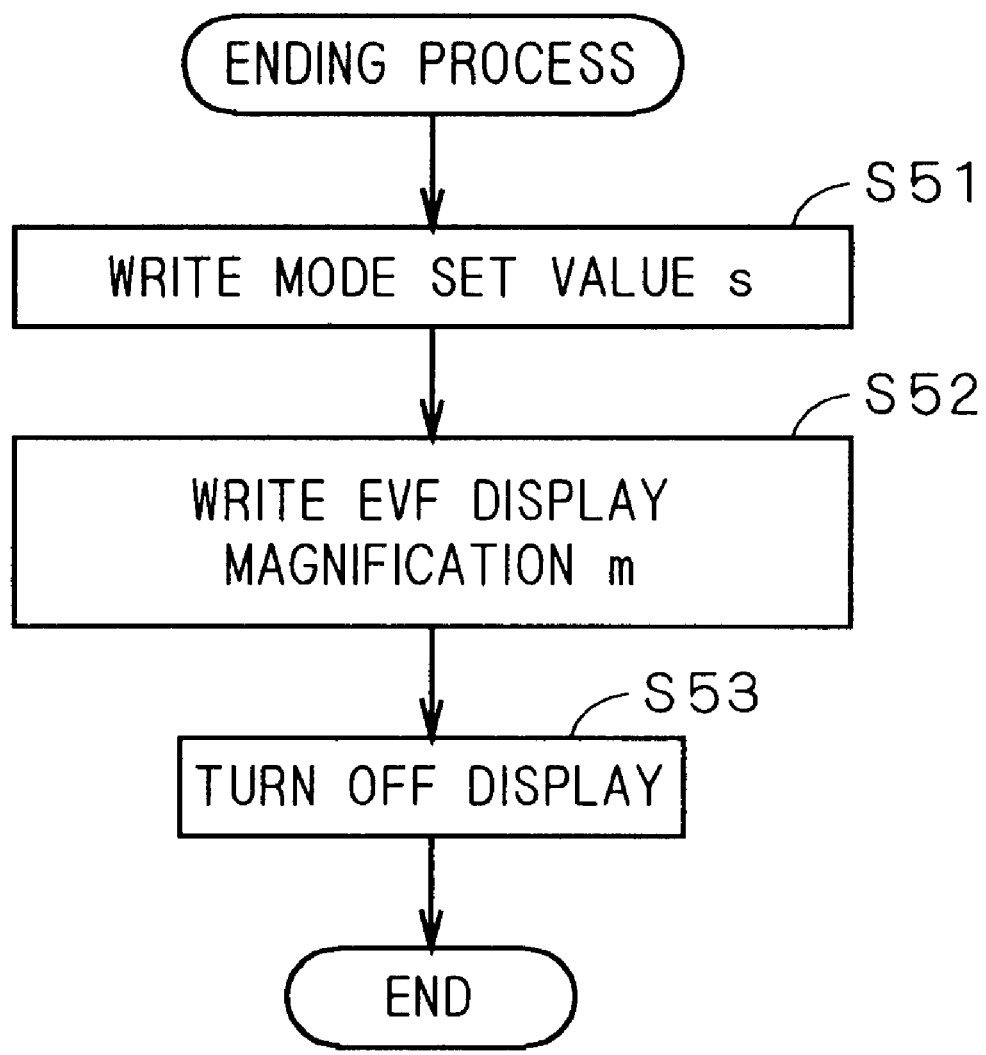
FIG. 12 is a flowchart showing the procedure of an ending process.

FIG. 12 is a flowchart showing a procedure of the ending process. The process is also executed by the display control unit 211c.

First, the display control unit 211c writes the current mode set value (s) to the flash ROM 211b (step S51 in FIG. 12).

The display control unit 211c writes the EVF display magnification (m) into the flash ROM 211b (step S52 in FIG. 12).

Finally, the display control unit 211c turns off the display on the LCD 10 and the EVF 20 (step S53 in FIG. 12). This is the end of the description of the processes from the turn-on of the power of the digital camera 1A to the turn-off of the power.

As described above, the digital camera 1A according to the first preferred embodiment corresponding to the electronic camera of the present invention has the third display mode in which the whole captured image is displayed on the LCD 10 as the first display and only the central area CA in the captured image is displayed on the EVF 20 as the second display. Consequently, the image capturing range can be confirmed by the LCD 10 and the focus can be confirmed by the EVF 20. Thus, the operability is excellent and an image can be captured efficiently.

Since the central area CA is in the center of the captured image, in the case of capturing an image in which the subject is positioned in the center, whether the focus is on the subject or not can be confirmed.

In the third display mode, the whole image is displayed on the LCD 10 having a large screen and the center image is displayed on the EVF 20 of high resolution. The displays are adapted to the confirmation of the image capturing range and the confirmation of the focus.

Since the central area CA is an area which is referred to at the time of automatic focusing by an automatic focusing mechanism (automatic focusing means), accurate focus on the main subject can be confirmed also in an auto-focus camera.

The central area CA is an area referred to upon adjustment of automatic exposure by an automatic exposure adjusting mechanism (automatic exposure adjusting means). Consequently, the result of the automatic exposure adjustment on the main subject can be confirmed also in an AE (automatic exposure) camera.

Since the central area CA is an area referred to upon automatic white balance adjustment by a white balance adjusting mechanism (white balance adjusting means), the result of the automatic white balance adjustment on the main subject can be confirmed by a WB (automatic white balance adjusting) camera.

Since the central area CA is variable, the range of an image displayed on the EVF 20, that is, the ratio of the main subject to a whole image can be changed according to the intention of the user.

At the time of turn-on of the power of the digital camera 1A, the EVF 20 displays the same area as that displayed on the EVF 20 at the time of the turn-off of the power last time, that is, it is controlled so that an image is displayed in the same display mode at the same EVF display magnification. Consequently, when the power of the digital camera 1A is turned off and is again turned on, it is unnecessary for the user to set the same area as that at the time of turn-off of the power, so that the operation is facilitated.

In the third display mode, the frame corresponding to the central area CA is displayed on the LCD 10. The range of the main subject can be therefore easily recognized.

Since the enlarged display icon as a notification image for notifying the user of the third display mode is displayed on at least one of the LCD 10 and the EVF 20, it can be confirmed that the range of image capturing is not limited to the central portion, so that the user can be prevented from being confused.

Further, by pressing the LCD button 31 twice in the third display mode, the mode is switched to the zeroth display mode, thereby finishing the image display on the LCD 10. The EVF 20 finishes the display of an image of the central area CA and displays the whole image. When only the EVF 20 is used, a problem such that the image capturing range and the display range do not coincide with each other can be eliminated.

2. Second Preferred Embodiment

Figure 13:
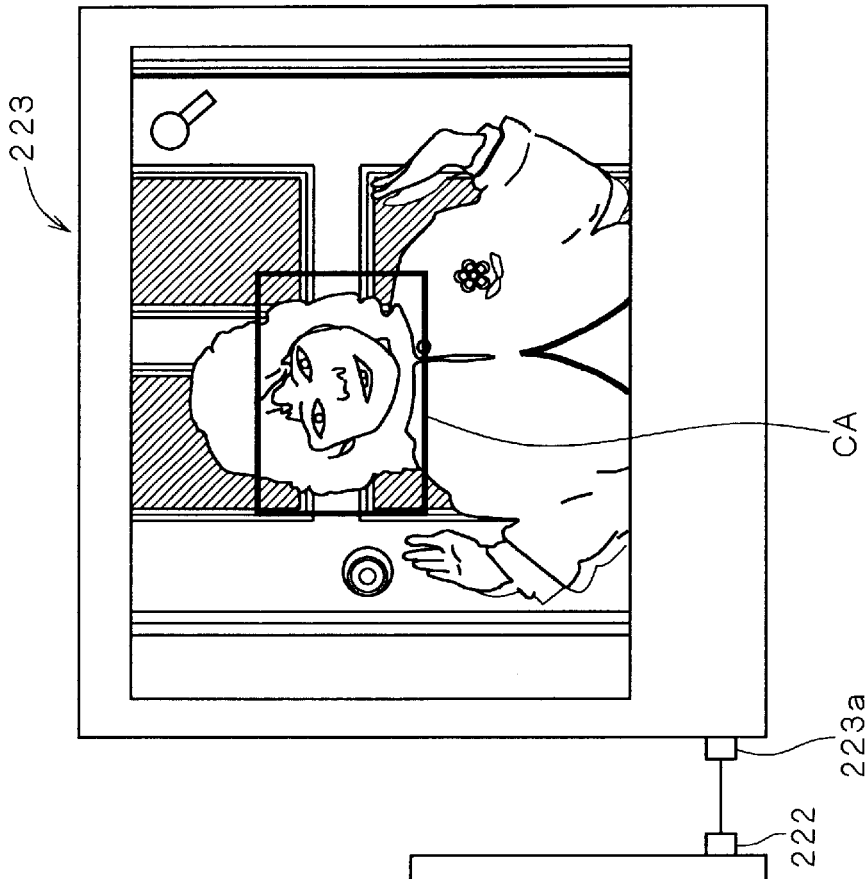
FIG. 13 is a configuration diagram of a display system according to a second preferred embodiment of the invention.
Figure 13:
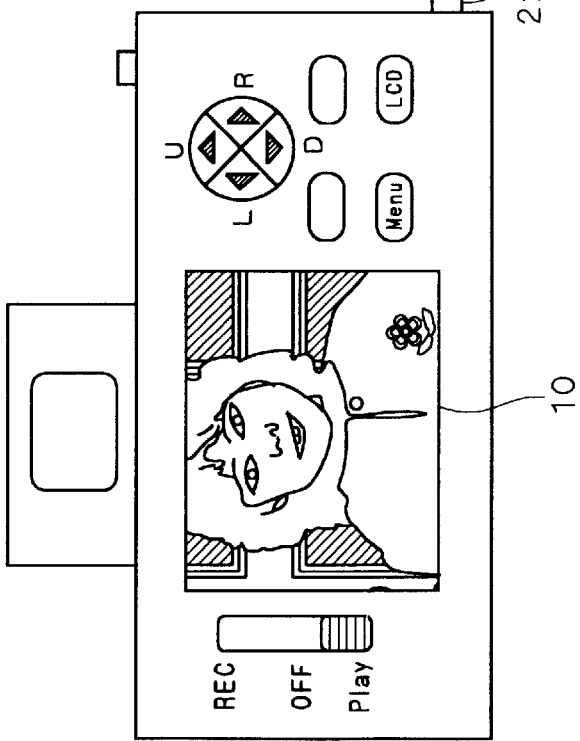

FIG. 13 is a construction diagram of a display system 100 according to a second preferred embodiment of the invention. The display system 100 mainly has a digital camera 1B and the external monitor 223 which are similar to those in the first preferred embodiment (refer to FIGS. 1 to 4). By connecting the external monitor terminal 222 of the digital camera 1B and an input terminal 223a of the external monitor 223 via a cable, the zeroth to fourth display modes in the first preferred embodiment can be realized by the LCD 10 of the digital camera 1B and the external monitor 223.

In the second preferred embodiment, however, an image displayed on the LCD in the digital camera according to the first preferred embodiment is displayed on the external monitor 223, and an image displayed on the EVF in the digital camera according to the first preferred embodiment is displayed on the LCD 10. For this reason, a display control unit 211j of the digital camera 1B according to the second preferred embodiment is slightly different from the display control unit 211c of the digital camera according to the first preferred embodiment.

FIG. 14 is a partial block diagram of the digital camera 1B according to the second preferred embodiment. In the display control unit 211j of the digital camera 1B of the second preferred embodiment, a display switching unit 211j1 is provided. The display switching unit 211j1 detects whether the external monitor 223 is connected to the external monitor terminal 222 or not. When it is determined that the external monitor 223 is connected to the external monitor terminal 222, the display switching unit 211j1 turns off the EVF 20 and switches between image data outputted to the VRAM 210 and that outputted to the VRAM 220. Since the image data written to the VRAMs 210 and 220 are therefore switched between them, images can be displayed on the LCD 10 and the external monitor 223 in the zeroth to fourth display modes in a manner similar to those in the first preferred embodiment. Especially, in the third display mode, only an image in the central area CA in an image displayed on the external monitor 223 can be enlargedly displayed on the LCD 10. The image can be seen at hand, so that the focus can be accurately confirmed.

At this time, it is sufficient to change the thinning rate at the time of transferring an image from the image memory 209 to the VRAM 220 to 2/5 and to change the thinning rate at the time of transferring an image from the image memory 209 to the VRM 210 to 1/4 m. Since the process of changing the magnification (m) when the button R or L is pressed is similar to that in the first preferred embodiment, the description is not repeated here.

The other construction in the digital camera 1B according to the second preferred embodiment is similar to that in the first preferred embodiment.

As described above, according to the second preferred embodiment, the display system 100 has the digital camera 1B as an electronic camera having the LCD and the external monitor 223 as a display device capable of displaying an image captured by the digital camera in a state where the external monitor 223 is connected to the digital camera 1B for communications. In the third display mode, the central area CA of an image displayed on the external monitor 223 is enlargedly displayed on the LCD 10 of the digital camera 1B. Consequently, the image capturing range can be confirmed on the external monitor 223 and the accurate focus can be confirmed on the LCD 10 of the digital camera. Thus, the operability is excellent and an image can be efficiently captured.

3. Modification

Although the examples of the electronic camera and the display system have been described in the foregoing preferred embodiments, the invention is not limited to the above.

For example, although the enlarged display icon is displayed only on the LCD in the first preferred embodiment, it may be displayed only on the EVF or on both the LCD and the EVF.

Although the central area of a whole image is displayed on the EVF in the third display mode in the foregoing preferred embodiments, the position is not limited to the central area. It is also possible to provide a designating mechanism (designating means) for designating a display position and to display an arbitrary portion in a whole image in accordance with designation of the user.

Although an image is enlargedly displayed on the LCD 10 of the digital camera 1B in the second preferred embodiment, in a manner similar to the first preferred embodiment, the LCD 10 may display a whole captured image and the external monitor 223 may enlargedly display the central area CA.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An electronic camera comprising:
    a first display capable of displaying a captured image;
    a second display capable of displaying said captured image, having a display size smaller than that of said first display;
    a first display controller for displaying an image of a first area within said captured image on said first display; and
    a second display controller for displaying an image of a second area, narrower than said first area, within said captured image onto said second display.

2. The electronic camera according to claim 1, wherein said first area corresponds to a whole area of said captured image, and said second area corresponds to a central area within said captured image.

3. The electronic camera according to claim 1, wherein said second display enlargedly displays said image of said second area.

4. The electronic camera according to claim 1, wherein said second display comprises an optical system.

5. The electronic camera according to claim 1, wherein said electronic camera adjusts focus of an image pickup lens on the basis of image data in said second area.

6. The electronic camera according to claim 1, wherein said electronic camera controls exposure on the basis of image data in said second area.

7. The electronic camera according to claim 1, wherein said electronic camera controls white balance on the basis of image data in said second area.

8. The electronic camera according to claim 1, wherein the size of said second area is variable.

9. The electronic camera according to claim 8, further comprising
    a setting member for setting display magnification of said second display relative to said first display,
    wherein the size of said second area is changed on the basis of a set value obtained by said setting member.

10. The electronic camera according to claim 1, further comprising
    a memory for storing information related to said second area,
    wherein said second display controller displays an image of said second area based on said information stored in said memory onto said second display when power is turned on.

11. The electronic camera according to claim 10, wherein said information stored in said memory is display magnification of said second display.

12. The electronic camera according to claim 1, wherein said first display controller further displays a frame corresponding to
    said second area on said first display.

13. The electronic camera according to claim 1, wherein said electronic camera displays an indicator indicating that said second area is displayed on said second display on at least one of said first and second displays.

14. The electronic camera according to claim 1, further comprising
    an operating member for turning off an image displayed on said first display,
    wherein when said first display is turned off by said operating member, said second display controller displays a whole captured image on said second display.

15. The electronic camera according to claim 1, wherein said captured image of said first area and said captured image of said second area are concurrently displayed.

16. A display control method of an electronic camera having a first display capable of displaying a captured image and a second display capable of displaying a captured image having a display size smaller than that of said first display, comprising the steps of:
    capturing an image of a subject;
    displaying an image of a first area within a captured image on said first display; and
    displaying an image of a second area narrower than said first area within said captured image on said second display.

17. The display control method according to claim 16, wherein
    said first area corresponds to a whole area of said captured image, and
    said second area corresponds to a central area of said captured image.

18. The display control method according to claim 16, further comprising
    a step of executing a predetermined process for image capturing on the basis of image data in said second area.

19. A display system having an electronic camera and an external display device capable of displaying an image captured by said electronic camera in a state where said display device is connected to said electronic camera, said system comprising:
    a first display capable of displaying a captured image;
    a second display capable of displaying said captured image;
    a first display controller for displaying an image of a first area in said captured image onto said first display; and
    a second display controller for enlargedly displaying an image of a second area, narrower than said first area, within said captured image onto said second display.

20. The display system according to claim 19, wherein said first display is provided for said display device, and said second display is provided for said electronic camera.

21. A recording medium in which a program to be executed by an electronic camera having a first display capable of displaying a captured image and a second display capable of displaying a captured image having a display size smaller than that of said first display is recorded and which can be read by a computer, said program having the steps of:
    capturing an image of a subject;
    displaying an image of a first area in said captured image onto said first display; and
    displaying an image of a second area, narrower than said first area, within said captured image onto said second display.

* * * * *